United States Patent [19]
Akiyama et al.

[11] 3,980,834
[45] Sept. 14, 1976

[54] MULTI-STAGE CONNECTION SWITCH FRAME

[75] Inventors: Tadahiko Akiyama, Yokohama; Shogo Nishigori, Kanagawa; Kenji Mochizuki, Kamakura, all of Japan

[73] Assignee: Hitachi, Ltd., Japan

[22] Filed: Jan. 31, 1975

[21] Appl. No.: 546,125

[30] Foreign Application Priority Data
Feb. 4, 1974 Japan.............................. 49-13731

[52] U.S. Cl................................ 179/98; 179/18 GF
[51] Int. Cl.² ......................................... H04Q 1/16
[58] Field of Search......... 179/1 PC, 18 GE, 18 GF, 179/98; 340/166 R

[56] References Cited
UNITED STATES PATENTS 3,529,094  9/1970  Erwin et al..................... 179/18 EA
3,539,730  11/1970  Imamura ....................... 179/18 GE Primary Examiner—Kathleen H. Claffy
Assistant Examiner—Randall P. Myers
Attorney, Agent, or Firm—Craig & Antonelli

[57] ABSTRACT

A multi-stage connection switch frame comprising crossbar switch lattices arrayed in at least three stages which are interconnected through links. Two adjacent stages of the multi-stage connection switch frame comprise a plurality of vertical groups each group comprising a plurality of upper part of verticals connected to each other by horizontals thereof in a multi-stage configuration and a plurality of lower part of corresponding verticals in all of the vertical groups being connected to each other by horizontals thereof in a multi-stage configuration, thereby to form the lattices in two stages which are coupled to each other through the verticals.

5 Claims, 3 Drawing Figures

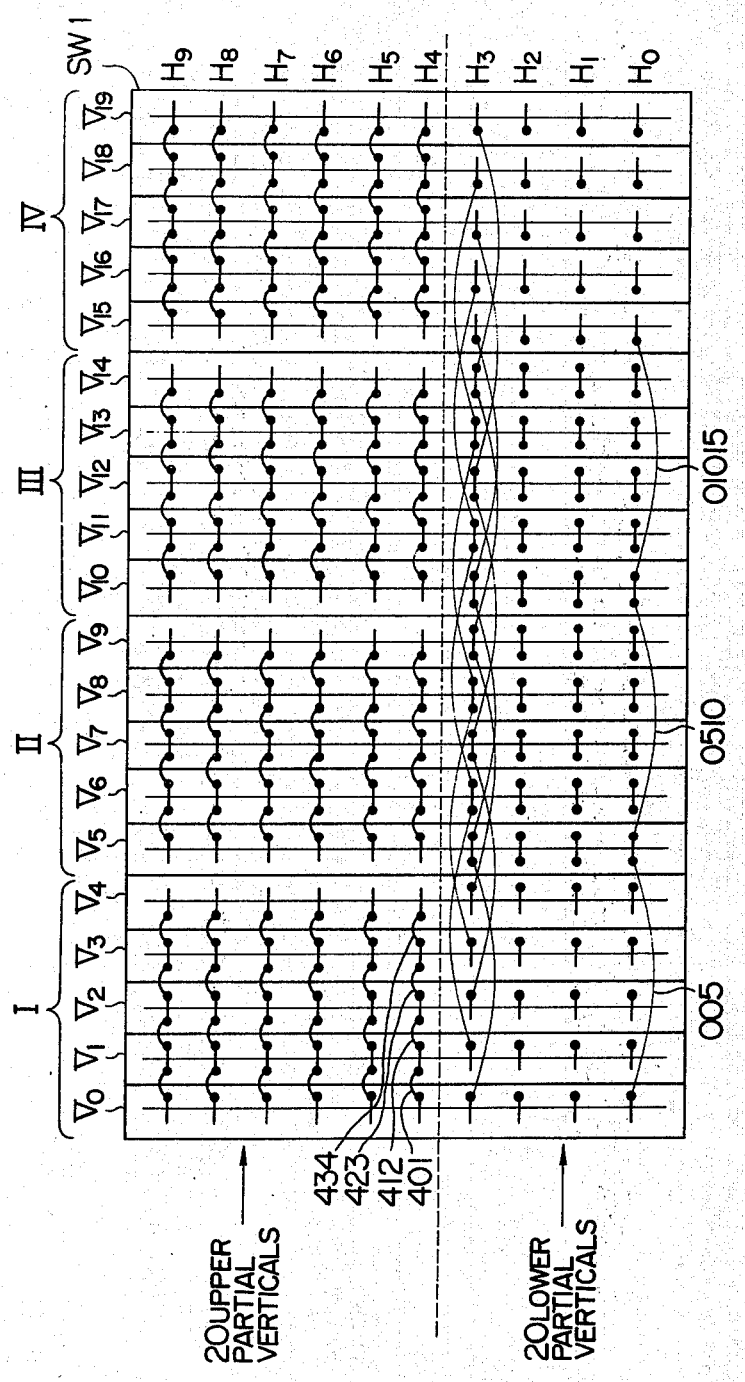

MULTI-STAGE CONNECTION SWITCH FRAME

The present invention relates in general to a switch frame for an automatic telephone switching system and in particular to a switch frame having lattices arranged in three or more stages.

In the past, there have been various propositions for the multi-stage connection switch frame constituted by using crossbar switches. However, the hitherto known multi-stage connection switch frames for three or more stages have required indispensably at least one physical crossbar switch for each of the stages. For example, the three-stage connection switch frame requires the three or more physical crossbar switches and the four-stage connection switch frame needs the use of the four or more physical crossbar switches. Theoretical crossbar switches or lattices each having a given number of verticals can be formed by severing vertically the horizontal multiple connection of physical crossbar switch or by connecting another physical crossbar switch to the horizontals in the multiple configuration. However, because of the impossibility to divide in the horizontal direction, inevitable restriction is imposed on the allowable size of the lattice in every stage. For this reason, when the crossbar switch used for practical application at present which has, for example, ten horizontals and twenty verticals is employed, the optional minimum number of lines or trunks is limited from the economical viewpoint in a switching system having three or more-stage connection switch frame.

An important object of the present invention is therefore to provide a multi-stage connection switch frame which allows the extension of the limited application thereof to a small number of the lines.

Another object of the invention is to provide a switch frame for a multi-stage connection having three or more connecting stages in which the physical crossbar switches are used in number less than that of the connecting stages.

Further object of the invention is to provide a multi-stage connection switch frame having lattices of a size best suited to the prevailing traffic.

According to the invention, there is provided a multi-stage connection switch frame comprising lattices each composed of the verticals of a physical crossbar switch with the verticals being connected by horizontals thereof in a multiple configuration, the lattices being arrayed at least in three stages, and links for connecting the lattices in the stages to one another, wherein two adjacent stages comprise a first type of lattices composed of a plurality of upper part of vertical groups each comprising a plurality of verticals connected each other by horizontals in the multiple configuration, the number of the lattices being equal to that of the vertical groups, and a second type of lattices each composed of the remaining other or lower part of corresponding verticals from each of the vertical groups and being connected each other by the horizontals in a multiple configuration such that the number of the second type lattices is equal to the number of the verticals in each of the vertical groups of upper verticals, wherein the first lattices and the second are coupled to each other through the links constituted by the verticals of the vertical groups.

According to a principal feature of the invention, the switch frame for the multiple stage connection has the lattices each composed of the verticals of a physical crossbar switch connected to each other with the corresponding horizontals and arrayed at least in three stages, the lattices being interconnected through the links. A switch frame for connection in two stages composed of the two adjacent stages comprises a plurality of vertical groups each comprising a plurality of upper part of verticals connected to each other with same horizontals in each of the vertical groups and a plurality of lower part of corresponding verticals in all of the vertical groups connected to each other with same horizontals in the multiple connections, thereby to form the lattices for two stages which are coupled to each other through the verticals which then serve as the links.

In a preferred embodiment of the invention, the two-stage connection switch frame mentioned above is constituted by a single physical crossbar switch and is additionally provided with the lattice of other stage constituted by another physical crossbar switch, wherein the lattice in one of the stages of the two-stage connection switch frame and the lattice of the just above mentioned other stage are connected through the links to form the three-stage connection switch frame.

According to another feature of the invention, the physical crossbar switch constituting the two-stage connection switch frame has verticals which take no parts in the constitution of the switch frame and are destined to serve for other connections.

The above and other objects as well as novel features and advantages of the invention will become more apparent from the following description of preferred embodiments of the invention made with reference to the drawings, in which:

FIG. 1a is a wiring diagram showing a multiple connection of horizontals of a physical crossbar switch used for constituting the two-stage connection switch frame which is to be incorporated in a three-stage switch frame embodying the principle of the invention;

FIG. 1b shows physical positions of the lattices in two-stages formed by the wiring shown in FIG. 1a.

Figure 1B:
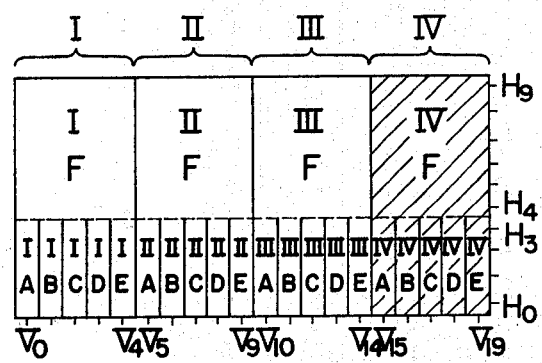

Now, referring to FIG. 1a which shows a multiple connection of horizontals for constituting a two-stage connection switch frame by using a single physical crossbar switch, the crossbar switch SW1 consists of twenty verticals V0 to V19, each of which has ten horizontals H0 to H9. The set of the twenty verticals is divided into four vertical groups I to IV for every fifth verticals in the vertical direction. It is to be noted that each of the 20 verticals V0 to V19 has multiple connections of horizontals which are different from each other in the upper part of horizontals (H4 or above) than in the lower part of horizontals (H3 or below). For the convenience of description made hereinafter, the upper part of the verticals including the horizontals (H4 and above) and the lower part of the verticals including the horizontals (H3 and below) are referred to as the upper partial vertical and the lower partial vertical, respectively. The number of the verticals for each of the lower and the upper partical verticals is apparently twenty. In the upper partial verticals, each of five verticals in every vertical group I to IV is connected to the associated horizontal in the multiple connection. For example, in case of the horizontal H4 for the five upper partial verticals in the vertical group I, the horizontal H4 is connected to these verticals in the multiple connection through connecting means such as shown by 401, 412, 423 and 434. In this manner, four lattices are obtained from the twenty upper partial verticals, as indicated by IF, IIF, IIIF and IVF in FIG. 1b.

On the other hand, in the twenty lower partial verticals the same horizontals of the corresponding verticals in all vertical groups I to IV, are connected in multiple configuration. For example, an associated horizontal HO of the four lower partial verticals at the left extremities of every vertical group I to IV are connected in multiple configuration as is indicated by 005, 0510 and 01015 in FIG. 1a. For the simplification of illustration, the multiple connections of the lower partial vertical to the corresponding horizontals are not shown in detail in FIG. 1a except for the case of the horizontal H3. It should however be understood that the same multiple connections are made for all the horizontals H0 to H3. In this manner, five lattices are produced from the twenty lower partial verticals. When these five lattices are represented by A, B, C, D and E, the lattices are composed of four verticals represented by IA to IVA, IB to IVB, IC to IVC, ID to IVD and IE to IVE, respectively, the physical or geometrical positions of which are shown in FIG. 1b. As a matter of fact, these verticals are the lower partial verticals.

Figure 2:
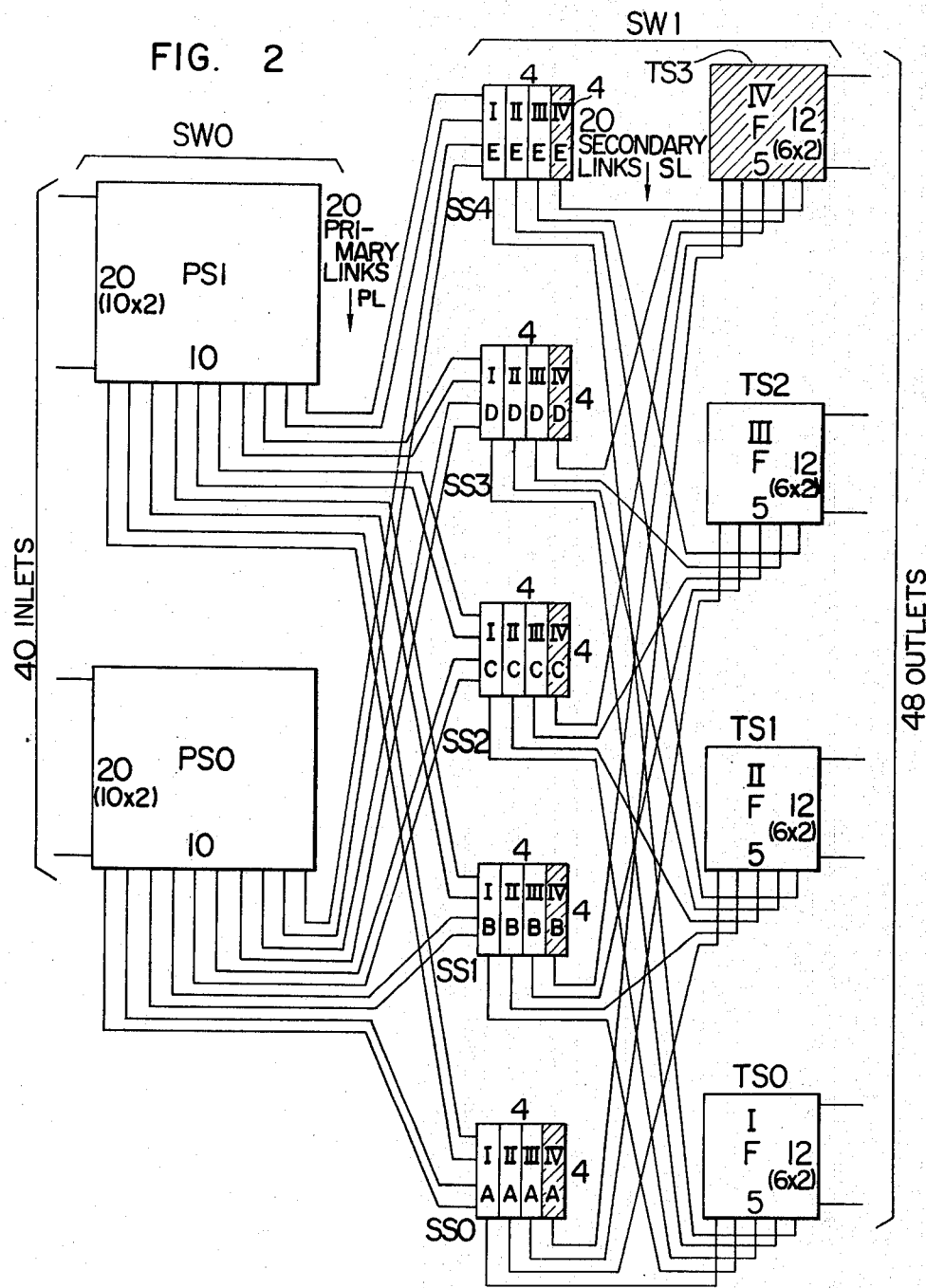
FIG. 2 shows schematically an arrangement of a three-stage connection switch frame according to the invention which includes therein the two-stage connection switch frame shown in FIGS. 1a and 1b.

When the multiple connections of the horizontals to the twenty verticals are made as shown in FIG. 1a, four lattices IF to IVF for certain stages and five lattices A to E for the other stages are coupled by links consisting of the verticals, whereby a two-stage connection switch frame is formed. An arrangement thereof is illustrated in the secondary and the tertiary stages in FIG. 2 in a form for having a better understanding. In more detail, as is shown in the crossbar switch SW1 of FIG. 2, the small blocks A, B, C, D and E constitute the lattices SS0, SS1, SS2, SS3 and SS4, respectively, while the blocks indicated by IF, IIF, IIIF and IVF constitute the lattices TS0, TS1, TS2 andd TS3, respectively. In FIGS. 1b and 2, the vertical group IV is indicated in hatching lines to clearly show the correspondences between the parts shown in FIG. 1b and those in FIG. 2. Twenty secondary links SL connecting the lattices arranged in the two stages SS and TS correspond to the verticals V0 to V19 shown in FIG. 1. It has heretofore been known that the horizontals of a single physical crossbar switch are connected in a multiple configuration as shown in FIG. 1 thereby to form a two-stage connection switch frame comprising two-stage lattices such as the secondary lattices SS0 to SS4 and the tertiary lattices TS0 to TS3 as shown in FIG. 2. However, in the past, the application thereof has been restricted only to a unique two-stage connection switch frame which is restricted in the number of the inlets and the outlets.

The present invention contemplates to constitute a switch frame for a three or more-stage connection switch frame including the above-mentioned two-stage switch frame, thereby to enlarge the limitation in the availability of the multi-stage connection switch frame.

Referring to FIG. 2 which shows an embodiment of the invention, a three-stage connection switch frame constructed by using two six-wire type physical crossbar switches SW0 and SW1. The secondary and the tertiary lattices SS0 to SS4 and TS0 to TS3 coupled together by the secondary links SL constitutes the two-stage connection switch frame comprising the single crossbar switch SW1, the secondary links SL being actually the verticals of the crossbar switch SW1. The first stage is constituted by two primary lattices PS0 and $PS_1$ which are formed by dividing the other single physical crossbar switch SW0 into two parts in the vertical direction. When the primary lattices $PS_0$ and PS1 and the secondary lattices SS0 to SS4 are connected through the primary links PL in full duplexes in a manner indicated in FIG. 2, the three-stage connection switch frame having 40 inlets, 20 primary links, 20 secondary links and 48 outlets can be formed wherein each of ten horizontals in the primary lattices and each of six horizontals in the third lattices are divided into two horizontals of three wires by means of wellknown relay-switching method.

With the frame configuration shown in FIG. 2, the traffic $\alpha$ (erlang) carried for an incoming line (or the calling rate) can be computed in the following manner on the assumption that the link blocking rate is 1/100;

$$1/100 = \left\{ \eta^2 + (1 - \eta^2) \gamma \right\}^5$$

wherein $\eta$ represents the efficiency of the primary links PL and $\gamma$ is that of the secondary links SL. Since the number of the primary links is equal to that of the secondary links, $$1/100 = (\eta^2 + \eta - \eta^3)^5 \tag{1}$$

On the other hand, $$20 \alpha = 10 \eta \tag{2}$$

From the equations (1) and (2), it follows $$\alpha \approx 0.167 \text{ (erl), or}$$

$$\alpha \approx 6 \text{ (Hcs)}$$

In case of the automatic telephone switching system, the above value of $\alpha$ can sufficiently meet the busy rate of 15% (5.4 Hcs) and three-stage connection switch frame shown in FIG. 2 can be satisfactorily employed for practical applications.

As can be seen from FIG. 2, the number of the intermediate links used in the multiple stage connection may be selected smaller than that of the incoming or outgoing lines. Accordingly, the intermediate lattices may be of a small size. In the past, since a restriction has been imposed on the size of the physical crossbar switches and hence on the size of the lattices, the intermediate lattices have been too great in size to obtain a multi-stage connection of a reduced scale. For this reason, limitation has been imposed on the minimum number of the lines or trunks for which the three or four-stage connection can be used.

On the contrary, according to the principle of the present invention, the intermediate lattice of a small size such as the secondary lattice of the embodiment shown in FIG. 2 which has been hitherto unavailable can be employed. Further, it is possible to form the intermediate lattice of a desired size by varying the number of the verticals constituting the vertical group and the manner in which the verticals are divided into the lower and the upper parts (see FIG. 1), whereby the most suitable intermediate lattice for the prevailing traffic condition can be obtained.

When the intermediate lattices formed in the above manner are employed, a three-stage connection switch frame having two crossbar switches as is shown in FIG. 2 is available which can be satisfactorily employed for practical applications. In brief, according to the present invention, a multi-stage connection switch frame of any desired scale having a high efficiency in the use of the crossbar switches can be constructed.

Although the embodiment shown in FIG. 2 concerns the three-stage connection, the invention can of course be applied to the switch frame for the four or more stages with similar advantages. In case of the embodiment shown in FIG. 2, the partial verticals IA, IIA, IIIA, IVA to IE, IIE, IIIE and IVE are used for the intermediate lattices. It is however possible to use the parts IF to IVF for the intermediate lattice, if the traffic condition allows it. Further, in case of the four or more-stage connection, either of the vertical parts IA to IVE and IF to IVF can be used for the intermediate lattices to the same effect. Although the switch frame for the two-stage connection is constituted by dividing the twenty verticals of the single physical crossbar switch SW1 into four groups each having five verticals in the arrangement shown in FIG. 2, it is equally possible to divide the verticals into five groups each having four verticals. Furthermore, three of the divided four groups each comprising five verticals may be used for the two-stage connection switch frame, while the remaining five verticals may be used for other functions such as the position links or call-back links. Besides, two or more crossbar switches may be divided into two or more vertical groups each comprising a plurality of verticals thereby to constitute the two-stage connection switch frame having the links formed by the verticals lying between the adjacent horizontals, which frame may then be incorporated in the three or more-stage connection switch frame as a part thereof.

What we claim is:

1. A multi-stage connection switch frame comprising lattices, each of said lattices being composed of crossbar switch verticals being connected by horizontals, said lattices being arrayed in at least three stages, and links for connecting said lattices in the stages to one another, wherein said multi-stage connection switch frame includes two adjacent stages of lattices comprising a plurality of verticals each connected by horizontals and being sectioned into an upper partial vertical and a lower partial vertical, each of said lattices included in one of said two adjacent stages comprising a vertical group of said upper partial verticals in which all of the upper partial verticals within said group are connected by horizontals, and each of the lattices in the other of said two adjacent stages comprises corresponding lower partial verticals from each one of said vertical groups in which each corresponding lower partial vertical is connected by horizontals, whereby said two adjacent stages are linked by said plurality of verticals.

2. A multi-stage connection switch frame as claimed in claim 1, wherein said plurality of vertical groups are constituted by verticals of a single physical crossbar switch.

3. A multi-stage connection switch frame as claimed in claim 1, wherein said lattices are arranged in three stages and one of said three stages other than said two adjacent stages is constituted by a single physical crossbar switch.

4. A multi-stage connection system comprising a plurality of physical crossbar switches, wherein at least one crossbar switch includes at least two adjacent stages, one of said two adjacent stages comprising a plurality of first lattices, each of said plurality of first lattices being a group of upper partial verticals connected by horizontals, and the other of said two adjacent stages comprising a plurality of second lattices, each of said second lattices being a plurality of lower partial verticals from each one of said vertical groups in which each corresponding lower partial vertical is connected by horizontals, said lower partial verticals in each of said second lattices corresponding to a respective upper partial vertical selected from each different first lattice such that the number of second lattices corresponds to the number of upper partial verticals in each of said first lattices, and respective first and second lattices are connected by way of said corresponding verticals.

5. A multi-stage connection system according to claim 4, wherein a third stage composed of a second physical crossbar switch is linked to said two adjacent stages.

* * * * *